(12) United States Patent
Maguin

(10) Patent No.: US 9,920,672 B2
(45) Date of Patent: Mar. 20, 2018

(54) METHOD FOR HEATING A DELIVERY DEVICE

(71) Applicant: CONTINENTAL AUTOMOTIVE GMBH, Hannover (DE)

(72) Inventor: Georges Maguin, Marly (FR)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/767,760

(22) PCT Filed: Feb. 12, 2014

(86) PCT No.: PCT/EP2014/052703
§ 371 (c)(1),
(2) Date: Aug. 13, 2015

(87) PCT Pub. No.: WO2014/124955
PCT Pub. Date: Aug. 21, 2014

(65) Prior Publication Data
US 2015/0377103 A1 Dec. 31, 2015

(30) Foreign Application Priority Data

Feb. 18, 2013 (DE) .................. 10 2013 101 573

(51) Int. Cl.
*F01N 3/20* (2006.01)
*F04B 53/08* (2006.01)

(52) U.S. Cl.
CPC ......... *F01N 3/2006* (2013.01); *F01N 3/2066* (2013.01); *F04B 53/08* (2013.01);
(Continued)

(58) Field of Classification Search
CPC ...... F01N 3/2006; F01N 3/2066; F01N 9/002; F01N 3/0842; F01N 13/02; F01N 3/035; F02D 41/029
(Continued)

(56) References Cited

U.S. PATENT DOCUMENTS

| 5,129,794 A | 7/1992 | Beatty |
| 2004/0086397 A1 | 5/2004 | Bowen |

(Continued)

FOREIGN PATENT DOCUMENTS

| DE | 10 2004 01112 A1 | 3/2005 |
| DE | 10 2005 003 583 | 7/2006 |

(Continued)

OTHER PUBLICATIONS

Office Action dated Feb. 14, 2017 which issued in the corresponding Chinese Patent Application No. 201480008886.2.
(Continued)

*Primary Examiner* — Patrick Maines
(74) *Attorney, Agent, or Firm* — Cozen O'Connor

(57) ABSTRACT

A method for heating a device for delivering a liquid additive, the device having at least one pump having at least one pump chamber and at least one movable pump chamber wall, the movable pump chamber wall being displaceable for the delivery of the liquid additive, includes: a) generating a vibration movement by at least one actuator; b) transmitting the vibration movement to the movable pump chamber wall; and c) converting the vibration movement into heat in the movable pump chamber wall.

7 Claims, 2 Drawing Sheets

(52) U.S. Cl.
CPC ...... *F01N 2610/02* (2013.01); *F01N 2610/10* (2013.01); *F01N 2610/105* (2013.01); *F01N 2610/144* (2013.01); *F01N 2610/1433* (2013.01); *Y02T 10/24* (2013.01)

(58) Field of Classification Search
USPC ......... 60/295, 301, 299; 417/44.9, 112, 395, 417/413.1
See application file for complete search history.

(56) References Cited

U.S. PATENT DOCUMENTS

| | | | | |
|---|---|---|---|---|
| 2007/0020123 | A1* | 1/2007 | Meyer | F04B 17/003 417/413.1 |
| 2007/0283685 | A1* | 12/2007 | Ripper | B01D 53/90 60/288 |
| 2009/0194604 | A1* | 8/2009 | Smith | B05B 1/304 239/1 |
| 2011/0186153 | A1* | 8/2011 | Vogt | F01N 3/206 137/535 |
| 2011/0311373 | A1* | 12/2011 | Garcia-Lorenzana | F04C 2/10 417/53 |
| 2013/0213014 | A1* | 8/2013 | Ohno | F01N 3/0842 60/277 |
| 2013/0327407 | A1 | 12/2013 | Hermann et al. | |
| 2015/0033712 | A1* | 2/2015 | Kruse | F01N 3/206 60/285 |
| 2015/0308427 | A1* | 10/2015 | Brueck | F01N 3/2066 417/53 |
| 2015/0377103 | A1 | 12/2015 | Maguin | |
| 2016/0131005 | A1* | 5/2016 | Bruck | F01N 3/2066 60/274 |

FOREIGN PATENT DOCUMENTS

| | | | | |
|---|---|---|---|---|
| DE | 102005003583 | * | 7/2006 | ......... B01D 53/9431 |
| DE | 10 2007 025 690 | | 12/2008 | |
| DE | 102008054689 | | 6/2010 | |
| DE | 102011075726 | | 11/2012 | |
| EP | 1 418 366 A1 | | 5/2004 | |
| JP | H 06-341376 | | 12/1994 | |
| JP | H08 35488 A | | 2/1996 | |
| JP | 2001-041176 | | 2/2001 | |
| JP | 2003-260332 | | 9/2003 | |
| JP | 2007-504396 | | 1/2007 | |
| JP | 2007-504396 | | 3/2007 | |
| JP | 2013-545929 | | 12/2013 | |
| WO | WO 2006064028 A1 | * | 6/2006 | ......... B01D 53/9431 |
| WO | WO 2012/152498 A1 | | 11/2012 | |
| WO | WO 2014/124955 | | 8/2014 | |

OTHER PUBLICATIONS

Office Action dated Jan. 11, 2017 which issued in the corresponding Korean Patent Application No. 10-2015-7025395.
Office Action dated Nov. 28, 2016 which issued in the corresponding Japanese Patent Application No. 2015-557404.

* cited by examiner

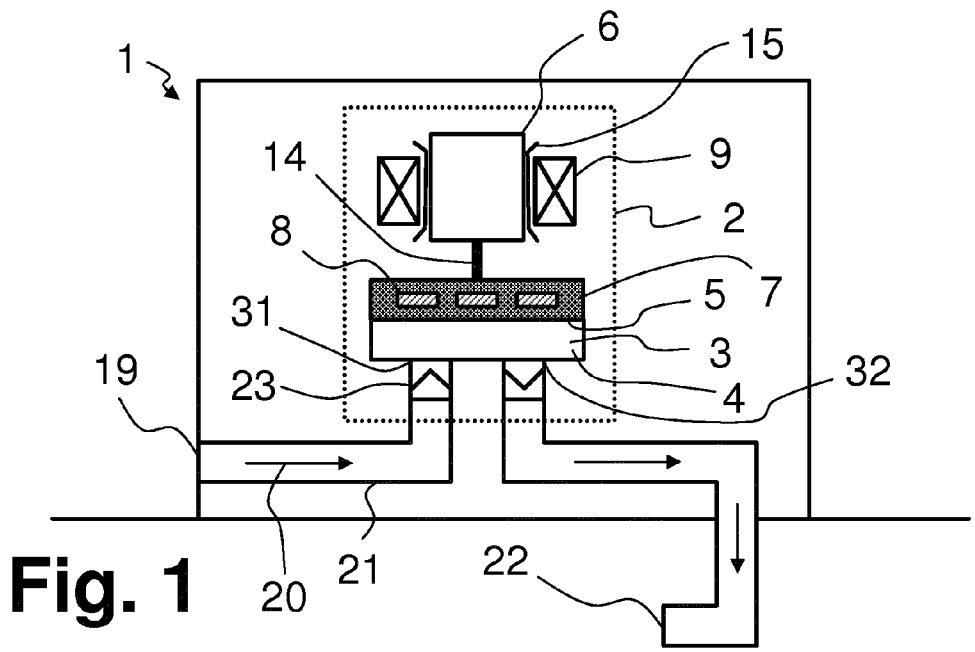
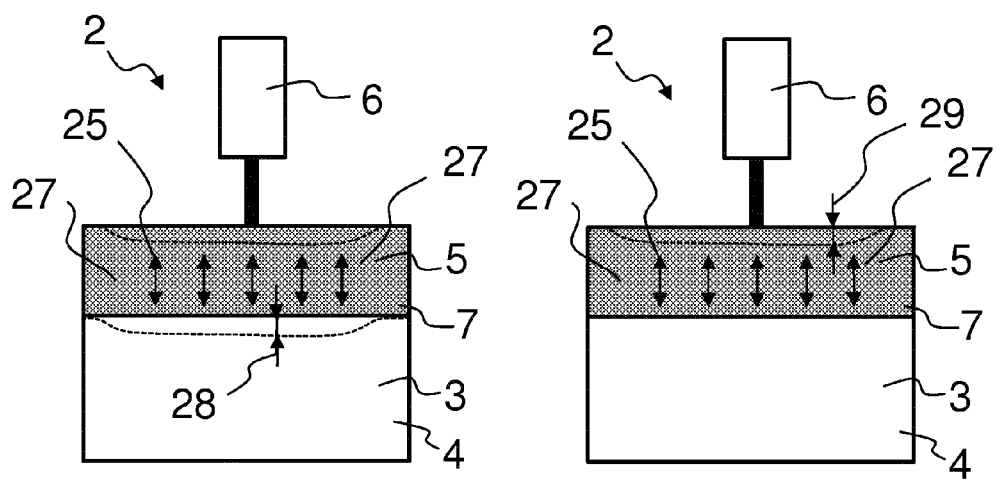

METHOD FOR HEATING A DELIVERY DEVICE

CROSS-REFERENCE TO RELATED APPLICATIONS

This is a U.S. national stage of application No. PCT/EP2014/052703, filed on 12 Feb. 2014, which claims priority to the German Application No. DE 10 2013 101 573.5 filed 18 Feb. 2013, the content of both incorporated herein by reference.

BACKGROUND OF THE INVENTION

1. Field of the Invention

The invention relates to a method for heating a device for delivering a liquid additive.

2. Related Art

Devices for delivering a liquid additive are used for example in the automotive field for supplying a liquid additive to the exhaust-gas treatment device of an internal combustion engine. Exhaust-gas treatment devices are widely used in which the reduction of nitrogen oxide compounds in the exhaust gas takes place with the aid of a liquid additive. Corresponding delivery devices can be used for exhaust-gas treatment devices of this type.

An exhaust-gas purification method particularly widely used in such exhaust-gas treatment devices is the process of selective catalytic reduction [SCR process]. In this process, ammonia is often used as a reducing agent for the reduction of nitro-gen oxide compounds. Ammonia can be obtained in an exhaust-gas treatment device from a urea-water solution. Here, the urea-water solution is converted to ammonia by thermolysis (thermally) and/or by hydrolysis (with the aid of a hydrolysis catalytic converter). The urea-water solution may be supplied to the exhaust-gas treatment device as liquid additive by a described delivery device. A corresponding urea-water solution is available for example under the trade name AdBlue® with a urea content of 32.5%.

A problem for devices for delivering liquid additive is that the additives (such as for example the described urea-water solution) can freeze at low temperatures. The described urea-water solution, for example, freezes at −11° C. In motor vehicles, such low temperatures arise for example during long standstill phases in winter. For this reason, heaters are often provided in devices for the delivery of liquid additives. By the heaters, the frozen additive in the device can be thawed, or the freezing of the additive can be prevented or slowed. Heaters are normally operated with electrical energy. Liquid-type heaters' are also known in which a heating fluid flows through a heating loop. In heating loops, (heated) cooling water of an internal combustion engine is typically used as heating fluid.

A problem with such heaters is that the introduction of heat often does not take place in the direct vicinity of the frozen additive, and therefore special structure is required for conducting the heat from the heater to the additive. Such structure for heat conduction often cannot be integrated, or can be integrated only with difficulty, into a delivery device. Furthermore, it is also the case that, with such structure, the heat generated by the heater can normally be dissipated to the liquid additive only after a time delay and with heat losses. Furthermore, the materials that are typically in contact with the liquid additive in a delivery device often have only low thermal conductivity, and therefore act as heat insulation between a heater and the liquid additive. If urea-water solution is used as liquid additive, the materials are, for example, special urea-resistant plastics. This additionally makes it difficult to provide structure for heat conduction.

SUMMARY OF THE INVENTION

Taking this as a starting point, it is an object of the present invention to solve or at least alleviate the technical problems highlighted in connection with the prior art. It is sought in particular to disclose a particularly advantageous method for heating a device for delivering a liquid additive.

Such objects are achieved by a method for heating a device for delivering a liquid additive, wherein the device has at least one pump with at least one pump chamber and with at least one movable pump chamber wall, and the movable pump chamber wall is deformed for the delivery of the liquid additive. The method has at least the following steps:

a) generation of a vibration movement by at least one actuator;
b) transmission of the vibration movement to the movable pump chamber wall; and
c) conversion of the vibration movement into heat in the movable pump chamber wall.

The device for delivering the liquid additive extracts the liquid additive, for example at a suction point, from a tank in which the liquid additive is stored. From the suction point, the liquid additive is delivered along a delivery duct in the device in a delivery direction to a line connector. The liquid additive is provided by the device at the line connector. To the line connector there may be connected a supply line which leads to a feed device. The feed device may be arranged on an exhaust-gas treatment device, and the liquid additive can be supplied to the exhaust-gas treatment device by the feed device.

For the delivery, the device has at least one pump. The pump is preferably integrated into the delivery duct. The at least one pump chamber is deformed by a movement of the (preferably single) movable pump chamber wall. The delivery of the liquid additive takes place as a result of this deformation. To drive the movement of the movable pump chamber wall, the device or the pump preferably has at least one actuator. The actuator may be actuated, for example, by an electromagnetic drive. The actuator may have, for example, a rotary drive and/or a linear drive. The actuator may also have transmission structure by which the movement of the actuator is transmitted to the movable pump chamber wall. The transmission structure may preferably also serve to convert a linear movement into a rotational movement or vice versa depending on whether the actuator is designed to generate a linear movement or to generate a rotational movement and depending on whether the movable pump chamber wall is to be moved with a linear movement or with a rotational movement. The transmission structure may comprise, for example, a connecting rod, a cam, a camshaft or a cam disk for the corresponding conversion of movements.

The vibration movement generated in step a) is characterized substantially in that the actuator of the device is moved rapidly back and forth. The vibration movement does not constitute a regular movement of the actuator, such as is performed for the delivery of the liquid additive. The maximum deflection of the vibration movement amounts to for example less than 5% and preferably less than 2% and particularly preferably even less than 1% of the maximum deflection of the movement of the actuator during normal delivery. In this regard it shall be considered that the movable pump chamber wall can be blocked by frozen additive inside the pump chamber. Therefore, great deflections shall not be performed. The deflection may also be referred to as amplitude, stroke, etc. The vibration movement preferably has a particularly high frequency. During the vibration movement, the actuator preferably moves back and forth at at least 200 Hz (1 Hz=1 cycle/second). The actuator particularly preferably even moves back and forth at at least 1.000 Hz or at least 5.000 Hz. The transmission of the vibration movement to the movable pump chamber wall takes place in step b) preferably in exactly the same way as the transmission of the normal delivery movement. For this purpose, the transmission structure described further above are for example provided within the device or within the pump of the device. The vibration movement has mechanical power, which is determined by the amplitude and the frequency of the vibration movement in combination with the force transmitted by the vibration movement. The mechanical power is mechanical energy that acts on the movable pump chamber wall per time. The mechanical power is converted into heat power in step c). The stiffness of the movable pump chamber wall is an important factor for the heat generated. The stiffness of the movable pump chamber wall has a great influence on the relation to force and amplitude. The force that acts on the movable pump chamber wall is the product of this amplitude and stiffness. The heat energy generated during a vibration cycle can be determined by the following formula. In this context, a vibration cycle is one movement of the movable pump chamber wall from a relaxed starting position to a deflected position which differs from the starting position with respect to the amplitude.

$$E_{heat} = \frac{1}{2} \cdot K_{Stiffness} \cdot x_{amplitude}^2$$

The movable pump chamber wall is in direct contact with the liquid additive in the pump chamber. It is therefore possible for the heat generated in the movable pump chamber wall to be transferred particularly quickly to the liquid additive. The movable pump chamber wall is often produced from materials which have a thermally insulating action. It is therefore difficult for heat energy to be conducted into the pump chamber from the outside through the movable pump chamber wall. It is accordingly particularly advantageous for heat to be generated directly in the movable pump chamber wall by the described method. In case that frozen additive is inside the pump chamber, the heat generated in the movable pump chamber wall first melts the additive being in direct contact with the movable pump chamber wall. This liquid additive improves the heat transfer from the movable pump chamber wall to the additive because liquid additive has a better heat conduction than frozen additive. Furthermore, the liquid additive being in direct contact with the movable pump chamber wall increases the possible amplitude of the movable pump chamber wall. In case that a greater amplitude is possible, this increases the power which can be introduced into the movable pump chamber wall and which can be converted to heating power.

The method is particularly advantageous if no delivery of liquid additive takes place during the vibration movement of the movable pump chamber wall in step b).

The frequency of the vibration movement may for example be selected to be so high that the liquid additive in the pump chamber is not delivered by the vibration movement. Furthermore and/or alternatively, the amplitude of the vibration can be selected to be so small that the liquid additive in the pump chamber is not delivered by the vibration movement. This effect arises because the liquid additive reacts inertly to the vibration movement. This inert behavior results from the mass and the viscosity of the liquid additive. It is also possible that the vibration movement merely causes a quantity of liquid additive to be delivered forward and backward again in each case along the delivery direction. It is therefore likewise the case, overall, that no delivery of liquid additive (in particular no discharge of additive at the line connector) takes place over the time period of the vibration movement. In case that the additive inside the pump is completely frozen, a delivery of liquid additive does not take place anyway because the pump is blocked by the frozen additive.

Since practically no delivery of liquid additive takes place, the described method can be utilized to (only) heat the device. This is advantageous, for example, during the procedure for starting the operation of a device, for the purpose of thawing frozen liquid additive in the device.

The method is furthermore advantageous if, in step c), as a result of the vibration movement, a compression of the movable pump chamber wall takes place in a regularly repeating manner, and the vibration movement is converted into heat as a result of the compression.

During the compression (squeezing) of the movable pump chamber wall, the movable pump chamber wall is not displaced or is displaced only to an insignificant extent. Instead, the (internal) volume of the movable pump chamber wall changes. If the movable pump chamber wall is merely compressed, it is particularly easy to avoid a delivery of liquid additive resulting from the vibration movement, because the vibration movement has practically no effect on the pump chamber volume and, rather, is fully compensated already within the pump chamber wall. The compression is converted into heat by internal friction in the pump chamber wall. The method is furthermore advantageous if, in step c), as a result of the vibration movement, a deformation of the movable pump chamber wall takes place in a regularly repeating manner, and the vibration movement is converted into heat as a result of the deformation. \

Deformation of the movable pump chamber wall particularly involves a deflection of the movable pump chamber wall. During a deflection and/or deformation of the movable pump chamber wall, the pump chamber wall is displaced such that a very small change in the pump chamber volume occurs. This change is, however, preferably so small that no delivery, or only an insignificant delivery, of liquid additive occurs. During the deflection and/or deformation, bending moments are preferably generated in the movable pump chamber wall, which bending moments generate heat by internal friction in the pump chamber wall. The generation of heat from a vibration movement by deflections and/or deformations is possible with virtually any flexible material. A particularly large amount of freedom thus exists for the configuration of the pump chamber wall if the vibration movement is converted into heat by deflections and/or deformations.

The method is furthermore preferable if the pump has at least one pump chamber with a closed pump chamber volume that is regularly increased and decreased in size for the delivery of the liquid additive.

A pump in which the pump chamber volume is regularly increased and decreased in size for the delivery of the liquid additive is typically a piston pump or a diaphragm pump. In the case of a pump of this type, the delivery duct of the device typically issues into the pump chamber at an inlet and emerges from the pump chamber again at an outlet. The inlet and the outlet are closed by valves. The valves typically open unidirectionally. The opening direction of the valves predefines the delivery direction of the pump. During the described vibration movement for generating heat in the movable pump chamber wall, the movable pump chamber wall is preferably moved so rapidly that either no change in the pump chamber volume whatsoever occurs, or the pump chamber volume is changed only so slightly that substantially no liquid additive enters into the pump chamber through the inlet and emerges from the pump chamber through the outlet. In the case of a pump with a pump chamber volume that regularly increases and decreases in size, a linear vibration movement can be converted into heat particularly effectively.

The method is also advantageous if the pump has at least one pump chamber with a closed pump chamber volume that is displaced continuously for the delivery of the liquid additive.

In a pump of this type, it is, for example, the case that a sealing point is moved along the delivery direction in the pump chamber. The sealing point is generated at the start of the pump chamber, is displaced through the pump chamber along the delivery direction, and is then eliminated again at the end of the pump chamber. A plurality of such sealing points is preferably provided simultaneously. Closed pump chamber volumes exist in each case between the individual sealing points. In a pump of this type, the vibration movement may be realized for example in the form of a rapid forward and backward movement of the sealing points. No delivery of liquid additive is possible by such a vibration movement because the quantity of liquid additive moved backward during the backward movement is always the same as that delivered during the forward movement.

A pump of this type may be a peristaltic pump. A peristaltic pump may be realized with a hose that forms the pump chamber and that is compressed in sections by an eccentric. The compressed points of the hose form the sealing points. It is also possible for a pump of this type to be realized with a diaphragm that is deformed in sections by an eccentric in order to form sealing points. In the case of a pump of this type, a relatively thick flexible material is generally required as a movable pump chamber wall. Such a thick flexible material normally has particularly low thermal conductivity, and therefore has an insulating action. In the case of a pump of this type, it is therefore advantageous for heat for heating the pump chamber to be generated in the movable pump chamber wall by the described method.

The method is particularly advantageous if the movable pump chamber wall comprises a diaphragm with inlays, wherein the inlays are designed to convert the vibration movement into heat.

In the case of the movable pump chamber wall being designed as a diaphragm with inlays, it is possible for the heat to be generated in the diaphragm in a particularly targeted manner. The diaphragm preferably has a matrix material in which the inlays are inlaid. Here, the matrix material is preferably designed so as to have particularly good flexibility. The inlays are designed to generate heat by deformation.

The method is furthermore advantageous if the movable pump chamber wall is thermally separate from the actuator. Thermal separation of this type may be realized for example by thermal insulation provided between the actuator and the pump chamber wall. The thermal insulation may be part of the transmission structure. By a thermal separation, it is, for example, possible to achieve that the heat generated in the movable pump chamber wall is introduced in a particularly targeted manner into the liquid additive and is not dissipated to the outside as lost heat. Furthermore, heating of the actuator and of the drive of the actuator can be avoided. This may improve the efficiency of the actuator and of the electric drive, because the efficiency of an electric drive is generally higher at relatively low temperatures, in particular if the electrical resistance of the coils of the electric drive changes in dependence of temperature.

The actuator is preferably designed such that the vibration movement required for the method can be generated without the actuator and the drive of the actuator themselves being significantly heated (for example in relation to normal delivery operation). The heating of the actuator results from power losses of the drive, and is therefore dependent on the efficiency of the drive. The amount of heat (the heat output) produced in the diaphragm by the vibration movement is preferably greater than, particularly preferably at least twice as great as or even five times as great as, the power losses of the drive.

Furthermore, there is also described herein a device for delivering a liquid additive, wherein the device has a pump with a pump chamber and with a movable pump chamber wall, and the movable pump chamber wall is displaced at least in sections for the delivery of the liquid additive, and the device is designed for carrying out the described method according to the invention. The device may have all of the special advantages and embodiment features, explained in conjunction with the method, of a device for delivering a liquid additive.

The invention is particularly preferably used in a motor vehicle, having an internal combustion engine, having an exhaust-gas treatment device for the purification of the exhaust gases of the internal combustion engine, and having a described device by which a liquid additive can be delivered to the exhaust-gas treatment device and by which the described method can be carried out.

BRIEF DESCRIPTION OF THE DRAWINGS

The invention and the technical field will be explained in more detail below on the basis of the figures. The figures show particularly preferred design variants, to which the invention is however not restricted. It is pointed out in particular that the figures, and the illustrated dimensional relationships, are merely schematic. In the figures:

FIG. 1: shows a schematic illustration of a described device;
FIG. 2: shows a first scetch of a first variant of a pump;
FIG. 3: shows a second scetch of a first variant of a pump.

DETAILED DESCRIPTION OF THE PRESENTLY PREFERRED EMBODIMENTS

Figure 4:
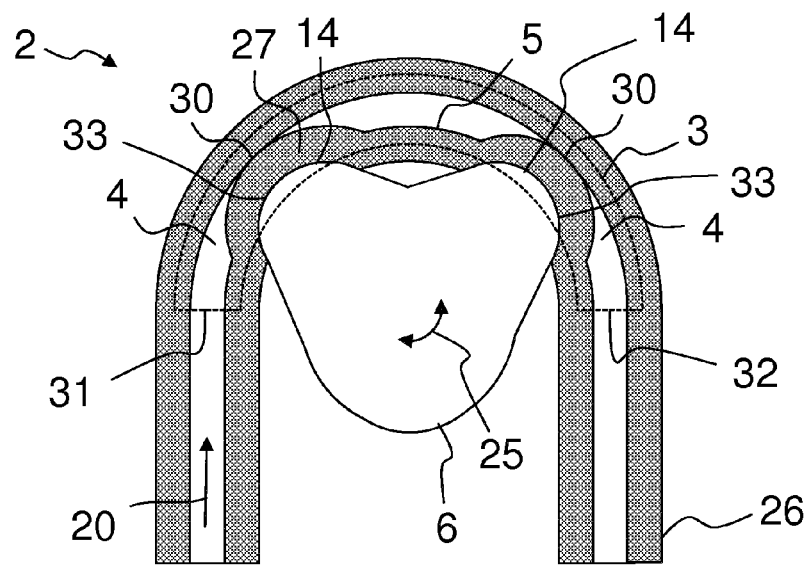
FIG. 4: shows a scetch of a second variant of a pump.

FIG. 1 shows a device 1 by which liquid additive can be delivered out of a tank at a suction point 19. Proceeding from the suction point 19, a delivery duct 21 runs with a delivery direction 20 through the device 1 to a line connector 22 at which the liquid additive can be provided. The device 1 has a pump 2 integrated into the delivery duct 21. The delivery duct 21 issues into the pump chamber 3 of the pump 2 at an inlet point 31 and emerges from the pump chamber 3 again at an outlet point 32. The inlet point 31 and the outlet point 32 are in each case closed by valves 23, which predefine the delivery direction 20 through the delivery duct 21.

The pump chamber 3 has a pump chamber volume 4 and a movable pump chamber wall 5. The movable pump chamber wall 5 can be moved to increase and decrease the size of the pump chamber volume 4. A delivery of liquid additive takes place as a result of the increase and decrease in size of the pump chamber volume 4. In the device of FIG. 1, the movable pump chamber wall 5 is formed by a diaphragm 7. In FIG. 1, inlays 8 are provided in the diaphragm 7, in which inlays a vibration movement of the diaphragm 7 or of the movable pump chamber wall 5 can be converted into heat.

To move the movable pump chamber wall 5, the device 1 has an actuator 6, the movement of which can be transmitted to the diaphragm by a transmission structure 14. The actuator may be for example a piston which is moved back and forth in a guide 15 and which is moved by an electromagnetic drive 9.

FIG. 2 and FIG. 3 illustrate different possible ways in which a vibration movement 25 can take place in a pump 2. The figures show in each case the actuator 6, the pump chamber 3, the pump chamber volume 4 and the movable pump chamber wall 5. The movable pump chamber wall 5 is formed in each case by a diaphragm 7. The vibration movement 25 is indicated by arrows. It can be seen in FIG. 2 that the movable pump chamber wall is displaced at least in sections by a deflection 28. As a result of the deflection 28, the pump chamber volume 4 is changed and a deformation of the movable pump chamber wall 5 occurs in a de-formation region 27. In this way, heat is generated in the movable pump chamber wall 5. In FIG. 3, a compression 29 occurs in which the internal volume of the movable pump chamber wall 5 or of the diaphragm 7 is changed, and no change in the pump chamber volume 4 takes place. Nevertheless, in the case of the compression 29 as per FIG. 3, too, a deformation is generated in a deformation region 27, such that heat is generated in the diaphragm 7.

FIG. 4 shows a different pump 2 for a device for the method described here. In the pump 2, the pump chamber 3 is at least partially in the shape of a circular arc and likewise has a movable pump chamber wall 5. The movable pump chamber wall 5 is formed for example by a hose 26. The movable pump chamber wall 5 may also be formed by some other material, for example a relatively thick diaphragm. The movable pump chamber wall 5 is deformed at least in sections by an actuator 6 such that at least one sealing point 30 is formed. During operation of the pump 2, sealing points 30 are formed at regular intervals at an inlet point 31 of the pump chamber 4 and are then displaced through the pump 4 along the delivery direction 20 to the outlet point 32, and are eliminated again there. For this purpose, the actuator 6 has at least one cam 33 as a transmission structure 14 between the actuator 6, or the drive of the actuator 6, and the movable pump chamber wall 5. The at least one cam 33 deforms the movable pump chamber wall 5 and thus forms the sealing points 30. A closed pump volume is formed between two sealing points 30. A movement of the actuator 6 results in a displacement of the sealing points 30 and thus a displacement of the closed pump volumes.

If the described method is implemented in the pump 2 as per FIG. 4, the actuator 6 performs a small vibratory rotational movement forward and backward. Here, no liquid additive is delivered because the amount of liquid additive delivered during the forward movement is in each case immediately conveyed backward during the backward movement. As a result of the deformation of the movable pump chamber wall 5, however, heat is generated therein in a targeted manner. The principle shown in FIG. 4 which is also described in the general part of the specification can be adapted in particular for any type of pump which works in accordance with the peristaltic principle. An important feature of these pumps is a movable pump chamber wall which is deformed for delivery. Here, it is of particular advantage that the deformation of the movable pump chamber wall during operation is equally distributed over the complete movable pump chamber wall. This enables that heat is introduced into the pump chamber by a large surface.

Figure 5:
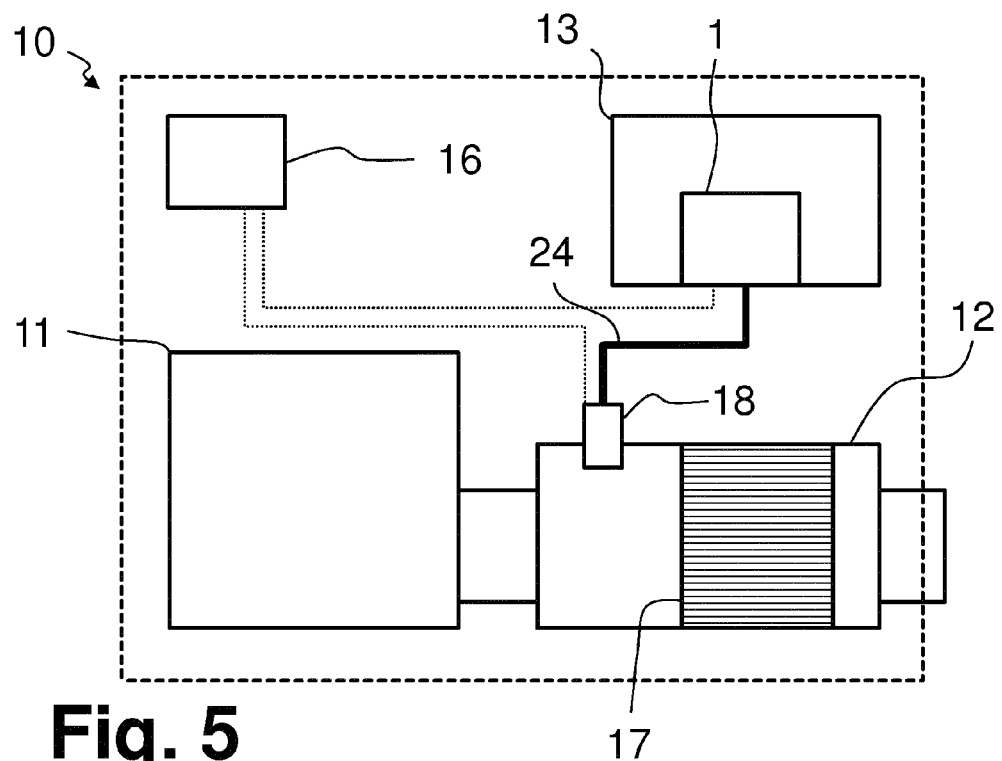
FIG. 5: shows a motor vehicle having a described device.

FIG. 5 shows a motor vehicle 10 having an internal combustion engine 11 and having an exhaust-gas treatment device 12 for the purification of the exhaust gases of the internal combustion engine 11. In the exhaust-gas treatment device 12 there is provided an SCR catalytic converter 17 by which the exhaust gases of the internal combustion engine can be purified by the process of selective catalytic reduction. To carry out the process of selective catalytic reduction, liquid additive can be supplied to the exhaust-gas treatment device 12 by an injector 18. The liquid additive is stored in the tank 13 and can be extracted from the tank 13 by a device 1 and delivered to the injector 18 via a supply line 24. The motor vehicle 10 has a control unit 16 by which the execution of the described method can be controlled.

By the method described here, the heating of a device for providing liquid additive is possible in a particularly simple and inexpensive manner, because no additional heaters are required in the device. Furthermore, the heat can be supplied to the liquid additive in a particularly targeted manner.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE NUMERALS

1 Device
2 Pump
3 Pump chamber
4 Pump chamber volume
5 Movable pump chamber wall
6 Actuator
7 Diaphragm
8 Inlay
9 Electromagnetic drive
10 Motor vehicle
11 Internal combustion engine
12 Exhaust-gas treatment device
13 Tank
14 Transmission means
15 Guide
16 Control unit 17 SCR catalytic converter
18 Injector
19 Suction point
20 Delivery direction
21 Delivery duct
22 Line connector
23 Valve
24 Supply line
25 Vibration movement
26 Hose
27 Deformation region
28 Deflection
29 Compression
30 Sealing
31 Inlet point
32 Outlet point
33 Cam

The invention claimed is:

1. A method for heating a device (1) for delivering a liquid additive, the device (1) having at least one pump (2) having at least one pump chamber (3) for storage of the liquid additive and at least one movable pump chamber wall (5) formed of a deformable diaphragm (7), delivery of the liquid additive being effected by a deformation of the deformable diaphragm (7), the method comprising:
   a) generating a vibration movement (25) by at least one actuator (6);
   b) transmitting the vibration movement (25) to the deformable diaphragm (7); and
   c) converting the vibration movement (25) into heat in the deformable diaphragm (7),
   wherein the vibration movement (25) of the deformable diaphragm (7) converted into heat has a frequency of sufficient magnitude to generate the heat in the deformable diaphragm (7) without causing delivery of the liquid additive during the vibration movement (25) of the deformable diaphragm (7) in step b).

2. The method as claimed in claim 1, wherein in step c), as a result of the vibration movement (25), a compression of the deformable diaphragm (7) takes place in a regularly repeating manner, and the vibration movement (25) is converted into heat as a result of the compression.

3. The method as claimed in claim 1, wherein in step c), as a result of the vibration movement (25), a deformation of the deformable diaphragm (7) takes place in a regularly repeating manner, and the vibration movement (25) is converted into heat as a result of the deformation.

4. The method as claimed in claim 1, wherein the at least one pump chamber (3) has a closed pump chamber volume (4), the method further comprising:
   regularly increasing and decreasing the size of the closed pump chamber volume (4) to deliver the liquid additive.

5. The method as claimed in claim 1, wherein the at least one pump chamber (3) has a closed pump chamber volume (4), the method further comprising:
   displacing continuously the closed chamber volume (4) to deliver the liquid additive.

6. The method as claimed in claim 1, wherein the deformable diaphragm (7) has inlays (8), the method further comprising:
   the inlays (8) converting the vibration movement (25) into heat.

7. The method as claimed in claim 1, wherein the deformable diaphragm (7) is thermally separate from the actuator (6).

* * * * *